United States Patent
Fujishiro

(10) Patent No.: US 12,550,015 B2
(45) Date of Patent: Feb. 10, 2026

(54) COMMUNICATION CONTROL METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 554 days.

(21) Appl. No.: 18/054,507

(22) Filed: Nov. 10, 2022

(65) Prior Publication Data

US 2023/0072977 A1 Mar. 9, 2023

Related U.S. Application Data

(63) Continuation of application No. PCT/JP2021/015617, filed on Apr. 15, 2021.

(30) Foreign Application Priority Data

May 11, 2020 (JP) .................................. 2020-083477

(51) Int. Cl.
H04W 36/00 (2009.01)

(52) U.S. Cl.
CPC .............................. *H04W 36/0064* (2023.05)

(58) Field of Classification Search
None
See application file for complete search history.

(56) References Cited

U.S. PATENT DOCUMENTS

| | | | | |
|---|---|---|---|---|
| 2012/0028627 A1* | 2/2012 | Hunzinger | .......... | H04W 36/302 455/422.1 |
| 2012/0082084 A1* | 4/2012 | Balakrishnan | .... | H04W 72/1215 455/7 |
| 2012/0320817 A1* | 12/2012 | Xu | .......... | H04W 8/08 370/315 |
| 2013/0052941 A1* | 2/2013 | Kitaji | ................. | H04B 7/15592 455/7 |
| 2021/0051547 A1* | 2/2021 | Koskinen | .............. | H04W 36/38 |
| 2022/0095194 A1* | 3/2022 | Sheng | ................... | H04W 76/19 |
| 2022/0104088 A1* | 3/2022 | Byun | .............. | H04W 36/0235 |
| 2022/0201777 A1* | 6/2022 | Teyeb | ................... | H04W 76/20 |
| 2023/0180076 A1* | 6/2023 | Paladugu | .......... | H04W 36/0058 370/331 |

* cited by examiner

*Primary Examiner* — Lonnie V Sweet
(74) *Attorney, Agent, or Firm* — Studebaker Brackett PLLC

(57) ABSTRACT

A communication control method for handing over a relay node from a source base station to a target base station or reestablishing connection of the relay node with the target base station instead of the source base station, the communication control method including transmitting, by a source base station, to a target base station, fronthaul configuration information related to a fronthaul connection established between a distribution unit of a relay node and the source base station.

3 Claims, 12 Drawing Sheets

COMMUNICATION CONTROL METHOD

RELATED APPLICATIONS

The present application is a continuation based on PCT Application No. PCT/JP2021/015617, filed on Apr. 15, 2021, which claims the benefit of Japanese Patent Application No. 2020-083477 filed on May 11, 2020. The content of which is incorporated by reference herein in their entirety.

TECHNICAL FIELD

The present disclosure relates to a communication control method used in a cellular communication system.

BACKGROUND OF INVENTION

The 3rd Generation Partnership Project (3GPP), which is a standardization project of a cellular communication system, has been studying introduction of a new relay node referred to as an Integrated Access and Backhaul (IAB) node. One or more relay nodes are involved in communication between a base station and user equipment, and perform relay for the communication.

SUMMARY

A communication control method according to a first aspect is a communication control method for handing over a relay node from a source base station to a target base station or reestablishing connection of the relay node with the target base station instead of the source base station, the communication control method including transmitting, by a source base station, to a target base station, fronthaul configuration information related to a fronthaul connection established between a distribution unit of a relay node and the source base station.

A communication control method according to a second aspect is a communication control method for handing over a parent relay node with a child relay node from a source base station to a target base station, the communication control method including: transferring, by a source base station, to a target base station, context information for a child relay node; and based on the context information, transmitting, by the target base station, a Radio Resource Control (RRC) reconfiguration message to the child relay node via the parent relay node.

DESCRIPTION OF EMBODIMENTS

An object of the present disclosure is to allow a relay node to smoothly perform handover or connection reestablishment from a source base station to a target base station.

A cellular communication system according to an embodiment will be described with reference to the drawings. In the description of the drawings, the same or similar parts are denoted by the same or similar reference signs.

Configuration of Cellular Communication System

Figure 1:
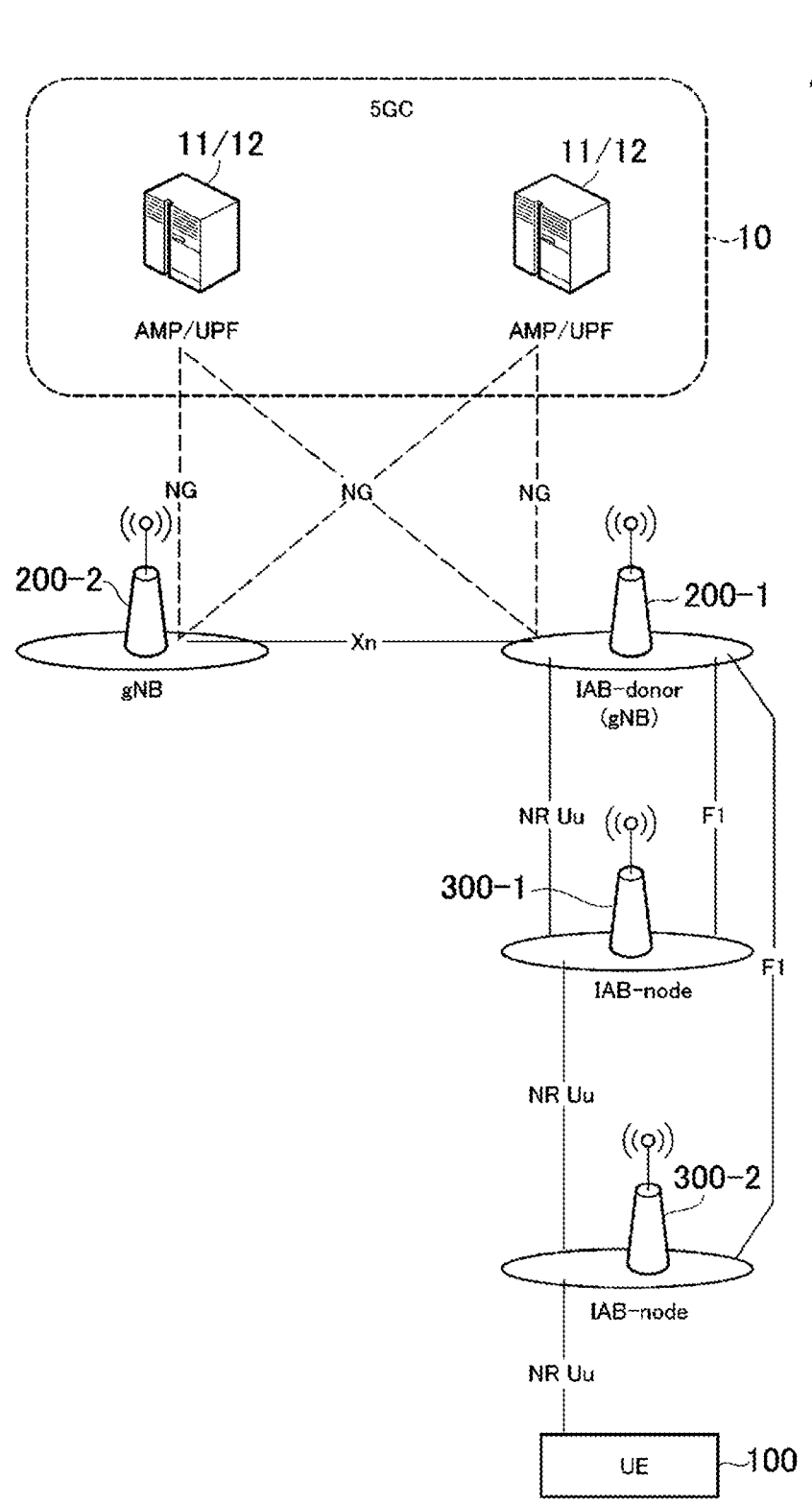
FIG. 1 is a diagram illustrating a configuration of a cellular communication system according to an embodiment.

First, a configuration of the cellular communication system according to an embodiment will be described. FIG. 1 is a diagram illustrating a configuration of a cellular communication system 1 according to an embodiment.

The cellular communication system 1 is a fifth generation (5G) cellular communication system based on the 3GPP standard. Specifically, a radio access scheme in the cellular communication system 1 is New Radio (NR) being a radio access scheme of the 5G. Note that Long Term Evolution (LTE) may be at least partially applied to the cellular communication system 1.

As illustrated in FIG. 1, the cellular communication system 1 includes a 5G core network (5GC) 10, user equipment (UE) 100, a base station (referred to as a gNB) 200, and an IAB node 300. The IAB node 300 is an example of a relay node.

An example in which the base station is an NR base station will be mainly described below. However, the base station may be an LTE base station (i.e., an eNB).

The 5GC 10 includes an Access and Mobility Management Function (AMF) 11 and a User Plane Function (UPF) 12. The AMF 11 is an apparatus that performs various types of mobility controls and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

Each gNB 200 is a fixed wireless communication node and manages one or more cells. The term "cell" denotes a minimum unit of a wireless communication area. The term "cell" may denote a function or a resource for performing wireless communication with the UE 100. One cell belongs to one carrier frequency.

Each gNB 200 is connected to the 5GC 10 each other via an interface referred to as an NG interface. FIG. 1 illustrates an example of two gNBs, a gNB 200-1 and a gNB 200-2 that are connected to the 5GC 10.

Each gNB 200 is interconnected to another neighboring gNB 200 via an inter-base station interface referred to as an Xn interface. FIG. 1 illustrates an example in which the gNB 200-1 is connected to the gNB 200-2.

Each gNB 200 may be divided into a central unit (CU) and a distributed unit (DU). The CU and the DU are interconnected via an interface referred to as an F1 interface. The F1 protocol is a communication protocol between the CU and the DU, and includes an F1-C protocol corresponding to a protocol for a control plane and an F1-U protocol corresponding to a protocol for a user plane.

The cellular communication system 1 supports an IAB that uses NR for the backhaul to enable wireless relay of NR access. The donor gNB 200-1 is a gNB 200 corresponding to a terminal node of the NR backhaul on the network side and including additional functions that support the IAB. The backhaul is capable of multi-hop via a plurality of hops (i.e., a plurality of IAB nodes 300).

An example is illustrated in FIG. 1 in which an IAB node 300-1 is wirelessly connected to the donor gNB 200-1, an IAB node 300-2 is wirelessly connected to the IAB node 300-1, and the F1 protocol is transmitted via two backhaul hops.

The UE 100 is a mobile wireless communication apparatus that can perform wireless communication with cells. The UE 100 may be any type of apparatus as long as the UE 100 is an apparatus that performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor gNB 200-1 via the IAB node 300-2 and the IAB node 300-1.

Figure 2:
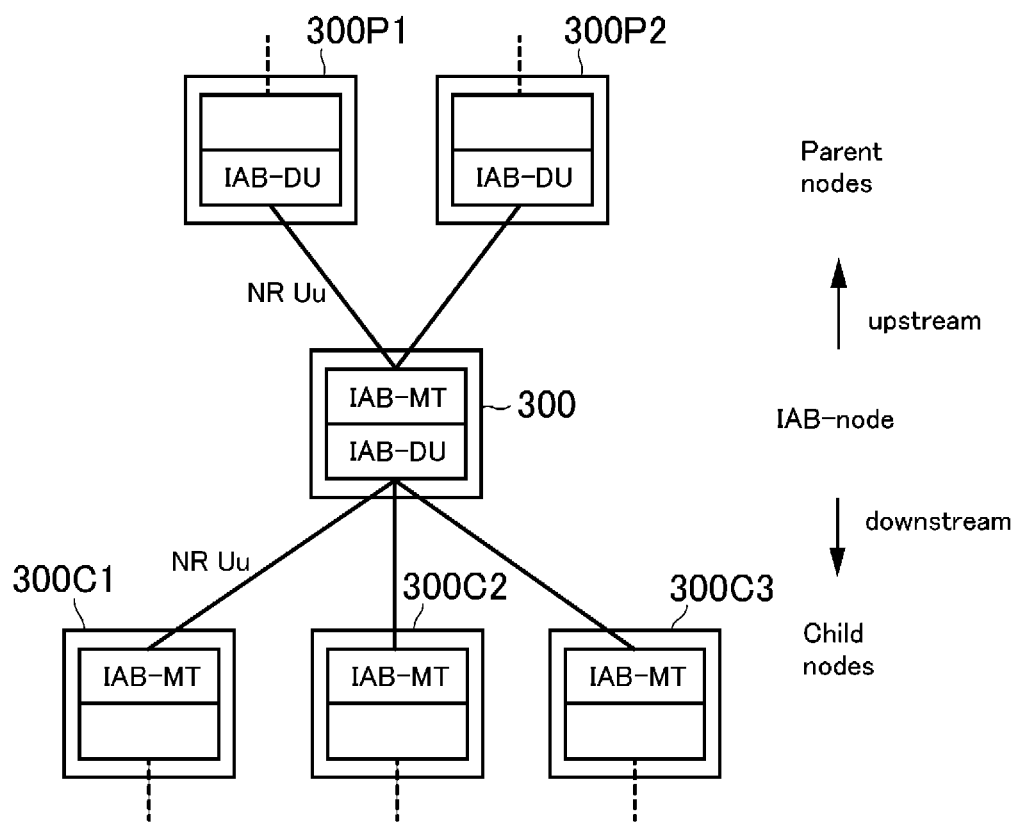
FIG. 2 is a diagram illustrating a relationship among an IAB node, parent nodes, and child nodes.

FIG. 2 is a diagram illustrating the relationship among the IAB node 300, the parent nodes, and the child nodes.

As illustrated in FIG. 2, each IAB node 300 includes an IAB-DU corresponding to a base station functioner and an IAB-Mobile Termination (MT) corresponding to a user equipment functioner.

Neighboring nodes on an NR Uu wireless interface of the IAB-MT (i.e., upper nodes) may be referred to as "parent nodes". The parent node is the DU of a parent IAB node or a donor gNB 200. A radio link between the IAB-MT and each parent node is referred to as a backhaul link. In FIG. 2, an example in which the parent nodes of the IAB node 300 are IAB nodes 300P1 and 300P2 is illustrated. Note that the direction toward the parent nodes is referred to as upstream.

Neighboring nodes on an NR access interface of the IAB-DU (i.e., lower nodes) may be referred to as "child nodes". The IAB-DU manages cells in a manner same as, and/or similar to the gNB 200. The IAB-DU terminates the NR Uu wireless interface to the UE 100 and the lower IAB nodes. The IAB-DU supports the F1 protocol for the CU of the donor gNB 200-1. In FIG. 2, an example in which the child nodes of the IAB node 300 are IAB nodes 300C1 to 300C3 is illustrated. Note that the direction toward the child nodes is referred to as downstream.

Configuration of Base Station

Figure 3:
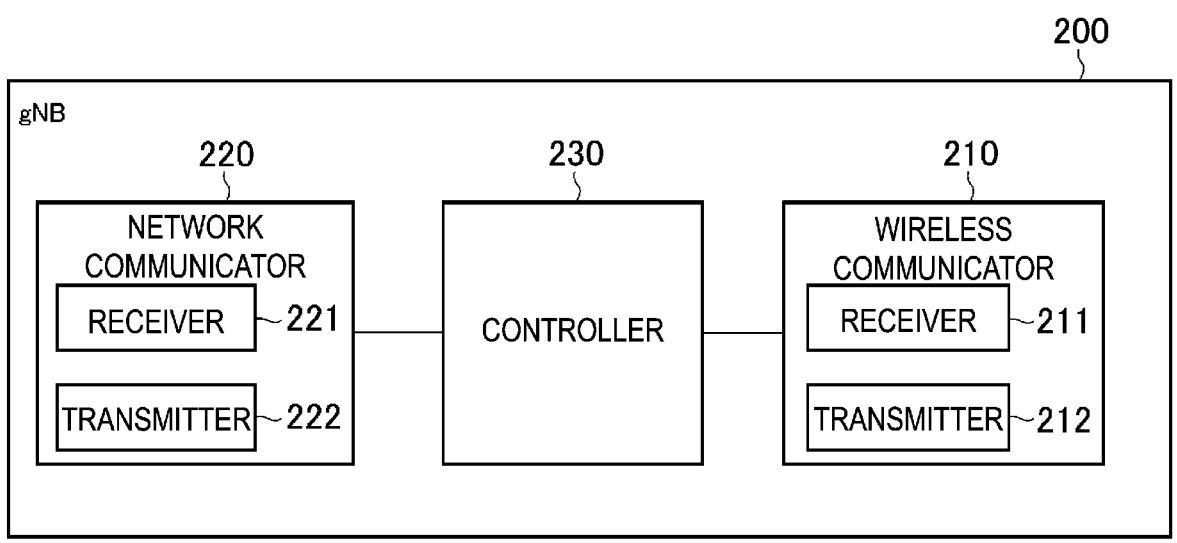
FIG. 3 is a diagram illustrating a configuration of a base station according to an embodiment.

A configuration of the gNB 200, corresponding to a base station according to an embodiment, will be described. FIG. 3 is a diagram illustrating a configuration of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of receptions under control of the controller 230. The receiver 211 includes an antenna, and converts a radio signal received by the antenna into a baseband signal (received signal) and outputs the baseband signal to the controller 230. The transmitter 212 performs various types of transmissions under control of the controller 230. The transmitter 212 includes an antenna, and converts a baseband signal (transmission signal) to be output by the controller 230 into a radio signal and transmits the radio signal from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of receptions under control of the controller 230. The receiver 221 receives a signal from the outside and outputs the received signal to the controller 230. The transmitter 222 performs various types of transmissions under control of the controller 230. The transmitter 222 transmits a transmission signal output by the controller 230 to the outside.

The controller 230 performs various types of controls for the gNB 200. The controller 230 includes at least one memory and at least one processor electrically connected to the memory. The memory stores programs to be executed by the processor and information to be used for processes by the processor. The processor may include a baseband processor and a Central Processing Unit (CPU). The baseband processor performs modulation and demodulation, and coding and decoding of a baseband signal, and the like. The CPU executes the programs stored in the memory to perform various types of processes. The processor performs processing of the layers described below.

Configuration of Relay Node

Figure 4:
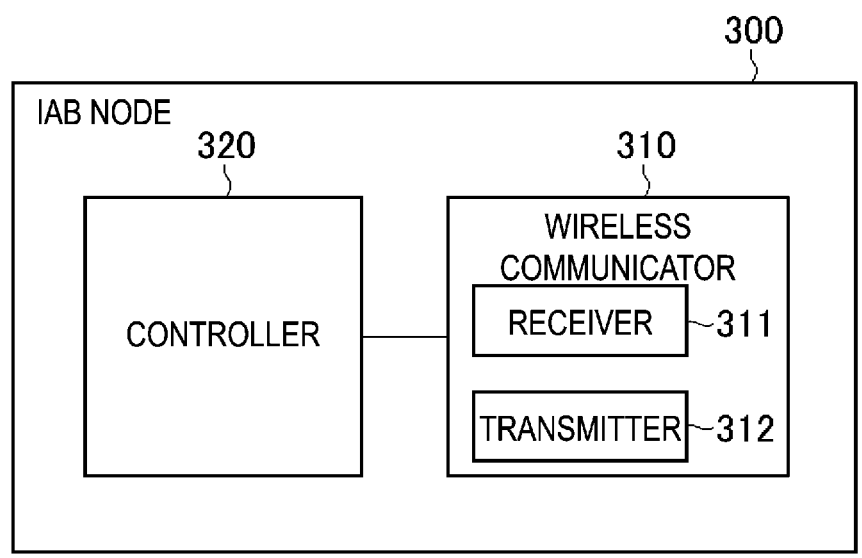
FIG. 4 is a diagram illustrating a configuration of a relay node according to an embodiment.

A configuration of the IAB node 300 that is a relay node according to an embodiment will be described. FIG. 4 is a diagram illustrating a configuration of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication (BH link) with the gNB 200 and performs wireless communication (access link) with the UE 100. The wireless communicator 310 for the BH link communication and the wireless communicator 310 for the access link communication may be provided separately.

The wireless communicator 310 includes a receiver 311 and a transmitter 312. The receiver 311 performs various types of receptions under control of the controller 320. The receiver 311 includes an antenna, and converts a radio signal received by the antenna into a baseband signal (received signal) and outputs the baseband signal to the controller 320. The transmitter 312 performs various types of transmissions under control of the controller 320. The transmitter 312 includes an antenna, and converts a baseband signal (transmission signal) to be output by the controller 320 into a radio signal and transmits the radio signal from the antenna.

The controller 320 performs various types of controls in the IAB node 300. The controller 320 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor performs processing of the layers described below.

Configuration of User Equipment

Figure 5:
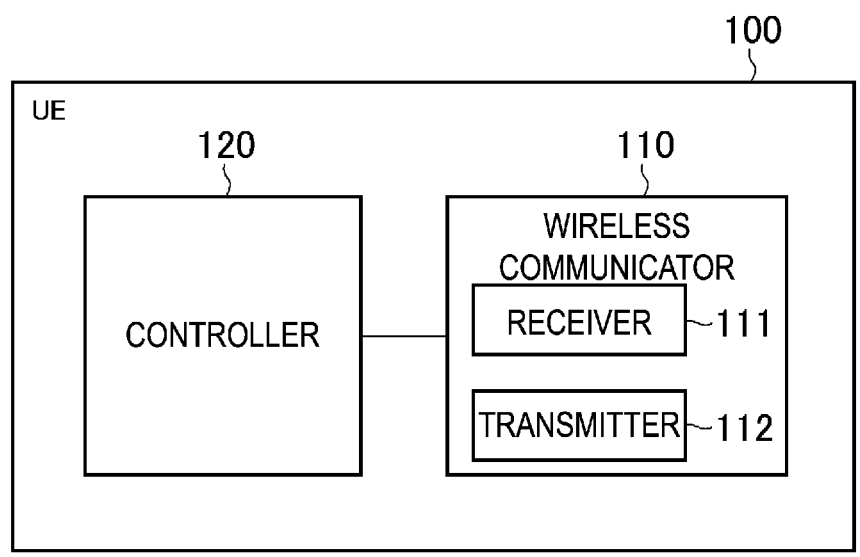
FIG. 5 is a diagram illustrating a configuration of user equipment according to an embodiment.

A configuration of the UE 100, corresponding to user equipment according to an embodiment, will be described. FIG. 5 is a diagram illustrating a configuration of the UE 100. As illustrated in FIG. 5, the UE 100 includes a wireless communicator 110 and a controller 120.

The wireless communicator 110 performs wireless communication in the access link, specifically, wireless communication with the gNB 200 and wireless communication with the IAB node 300. The wireless communicator 110 may perform wireless communication in the sidelink, that is, wireless communication with another UE 100. The wireless communicator 110 includes a receiver 111 and a transmitter 112. The receiver 111 performs various types of receptions under control of the controller 120. The receiver 111 includes an antenna, and converts a radio signal received by the antenna into a baseband signal (received signal) and outputs the baseband signal to the controller 120. The transmitter 112 performs various types of transmissions under control of the controller 120. The transmitter 112 includes an antenna, and converts a baseband signal (transmission signal) to be output by the controller 120 into a radio signal and transmits the radio signal from the antenna.

The controller 120 performs various types of controls for the UE 100. The controller 120 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor performs processing of the layers described below.

Configuration of Protocol Stack

Figure 6:
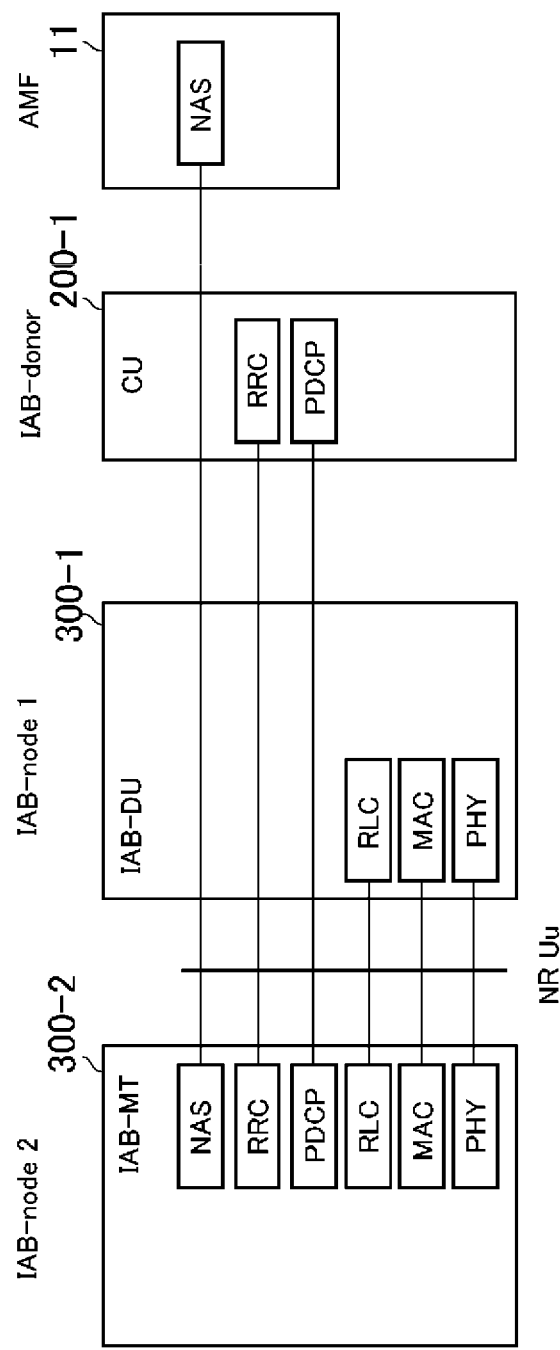
FIG. 6 is a diagram illustrating a configuration of a protocol stack according to an embodiment.

A configuration of the protocol stack according to an embodiment will be described. FIG. 6 is a diagram illustrating an example of a protocol stack related to an RRC connection and an NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs priority control of data, a retransmission process through a hybrid ARQ (HARQ), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines transport formats (transport block sizes, modulation and coding schemes (MCSs)) in the uplink and the downlink and resource blocks to be allocated.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the donor gNB 200-1 via a radio bearer.

The RRC layer controls a logical channel, a transport channel, and a physical channel according to establishment, reestablishment, and release of a radio bearer. RRC signaling for various configurations is transmitted between the RRC layer of the IAB-MT of the IAB node 300-2 and the RRC layer of the donor gNB 200-1. With an RRC connection to the donor gNB 200-1, the IAB-MT is in an RRC connected mode. With no RRC connection to the donor gNB 200-1, the IAB-MT is in an RRC idle mode.

The NAS layer higher than the RRC layer performs session management, mobility management, and the like. NAS signaling is transmitted between the NAS layer of the IAB-MT of the IAB node 300-2 and the AMF 11 of the NAS layer.

Figure 7:
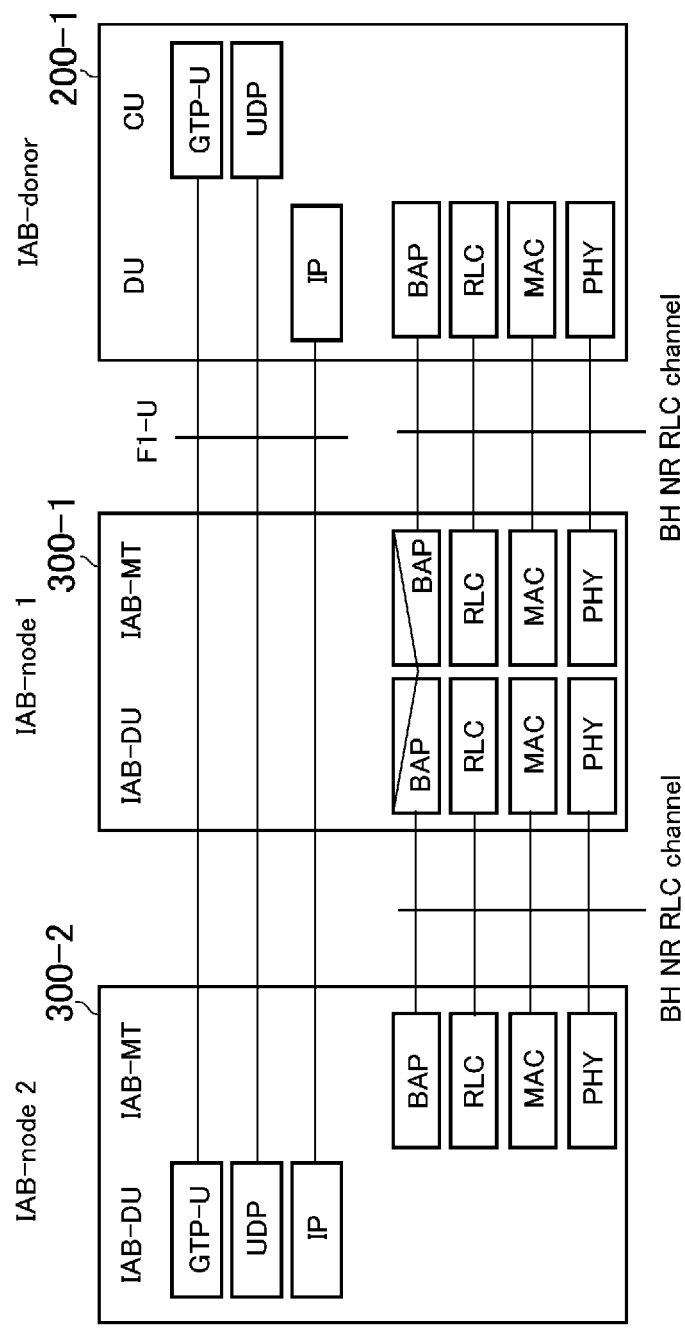
FIG. 7 is a diagram illustrating a protocol stack related to an F1-U protocol.
Figure 8:
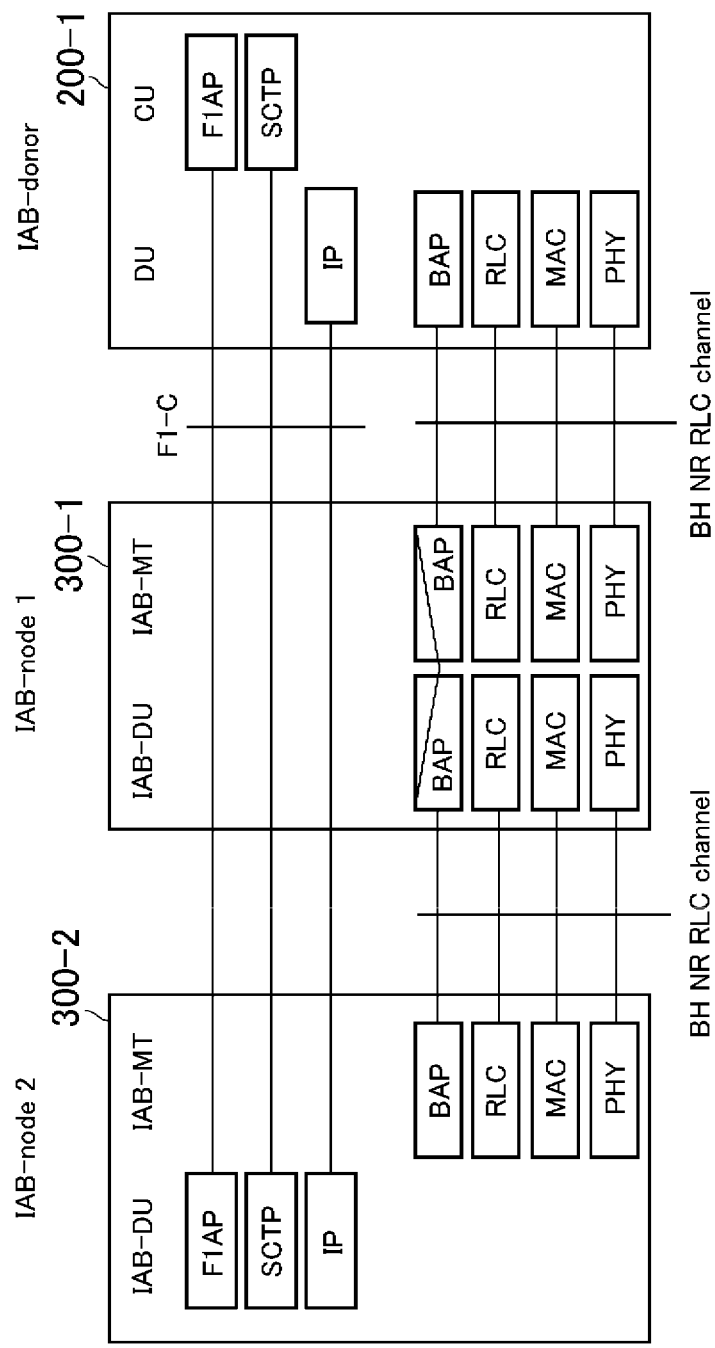
FIG. 8 is a diagram illustrating a protocol stack related to the F1-C protocol.

FIG. 7 is a diagram illustrating an example of a protocol stack for the F1-U protocol. FIG. 8 is a diagram illustrating an example of a protocol stack for the F1-C protocol. Here, an example in which the donor gNB 200-1 is divided into the CU and the DU is illustrated.

As illustrated in FIG. 7, each of the IAB-MT of the IAB node 300-2, the IAB-DU of the IAB node 300-1, the IAB-MT of the IAB node 300-1, and the DU of the donor gNB 200-1 includes a Backhaul Adaptation Protocol (BAP) layer as an upper layer of the RLC layer. The BAP layer is a layer that performs routing processing and bearer mapping and demapping processing. In the backhaul, the IP layer is transmitted via the BAP layer to allow routing through multiple hops.

In each backhaul link, Protocol Data Units (PDUs) of the BAP layer are transmitted by the backhaul RLC channel (BH NR RLC channel). Configuring multiple backhaul RLC channels in each BH link enables the prioritization and QoS control of traffic. The association between the BAP PDU and the backhaul RLC channel is performed by the BAP layer of each IAB node 300 and the BAP layer of the donor gNB 200-1.

As illustrated in FIG. 8, the protocol stack of the F1-C protocol includes an F1AP layer and an SCTP layer instead of a GTP-U layer and a UDP layer illustrated in FIG. 7.

Operations of Cellular Communication System

Operations of the cellular communication system 1 according to an embodiment will be described. The operations are operations for handover of the IAB node 300 from the source gNB 200-1 (source base station) to the target gNB 200-2 (target base station).

An example will be described below in which the IAB node 300-2 (hereinafter referred to as the "child IAB node 300-2"), used as a child node, is connected to the IAB node 300-1 (hereinafter, referred to as the "parent IAB node 300-1"), used as a parent node, and in which handover of the child IAB node 300-2 is performed with handover of the parent IAB node 300-1. However, the operations may be operations in which only one IAB node 300 is handed over from the source gNB 200-1 (source base station) to the target gNB 200-2 (target base station).

Figure 9:
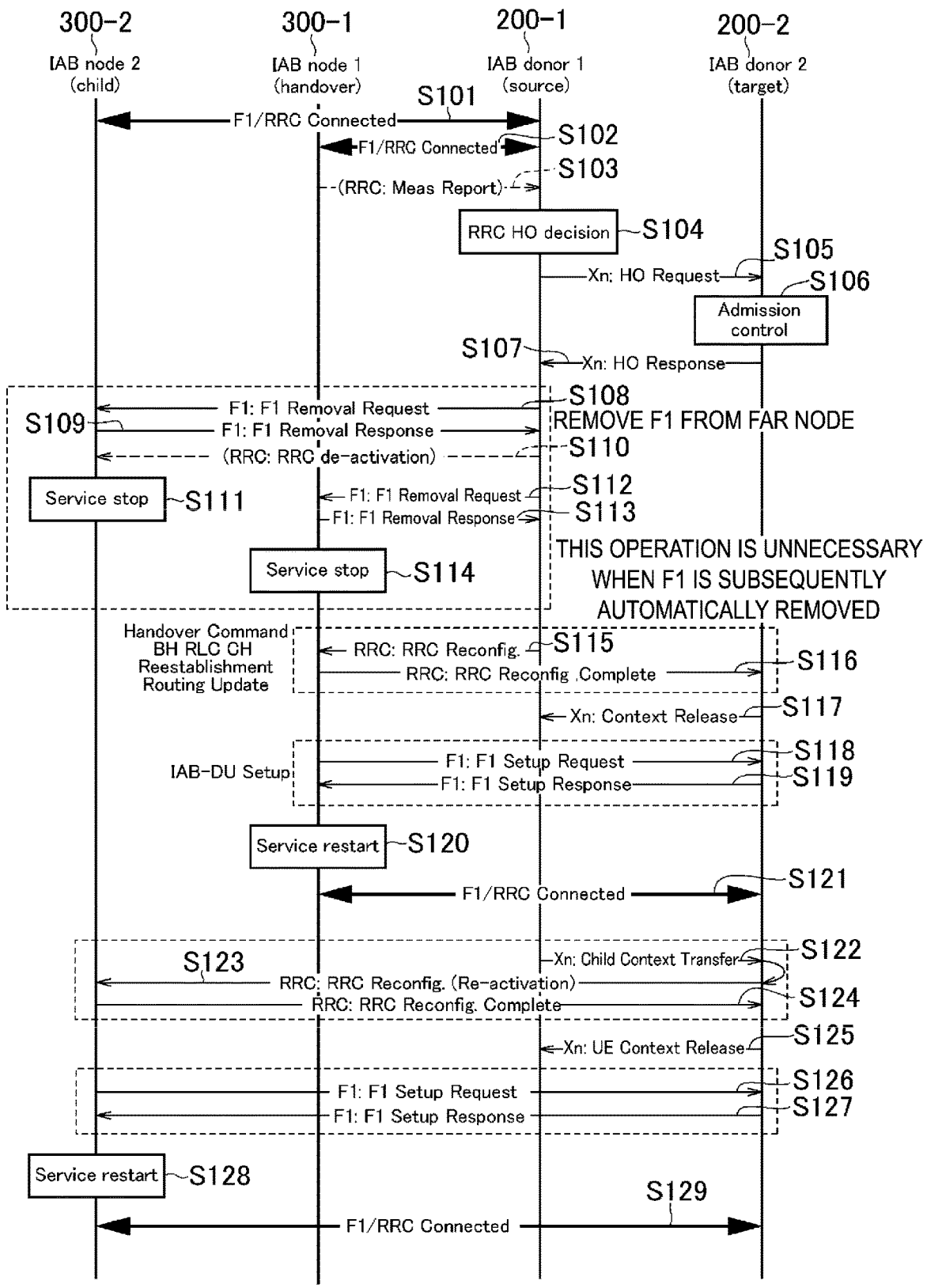
FIG. 9 is a diagram illustrating operations of a cellular communication system according to an embodiment.

FIG. 9 is a diagram illustrating the operations of the cellular communication system 1 according to an embodiment. In FIG. 9, dashed lines illustrate steps that are optional.

As illustrated in FIG. 9, in step S101, an F1 interface connection (hereinafter referred to as an "F1 connection") and an RRC connection are established between the child IAB node 300-2 and the source gNB 200-1. In step S102, an F1 connection and an RRC connection are established between the parent IAB node 300-1 and the source gNB 200-1. The F1 connection is an example of the fronthaul connection.

In step S103, the IAB-MT of the parent IAB node 300-1 transmits, to the source gNB 200-1, a measurement report (Meas Report) including measurement results for the radio state. The RRC layer message includes the measurement report.

In step S104, the RRC layer of the source gNB 200-1 determines the handover of the parent IAB node 300-1 to the target gNB 200-2 based on the measurement report from the parent IAB node 300-1.

In step S105, the source gNB 200-1 transmits a handover request (HO Request) requesting handover of the parent IAB node 300-1, to the target gNB 200-2 via an Xn interface which is an inter-base station interface.

In step S106, the target gNB 200-2 performs admission control of handover for the parent IAB node 300-1, based on the handover request from the source gNB 200-1. Here, description will be given on the assumption that the handover is determined to be executable. The target gNB 200-2 modifies, as necessary, the RRC context information included in the handover request.

In step S107, the target gNB 200-2 transmits a handover response (HO Response) to the source gNB 200-1 via the Xn interface.

In step S108, the source gNB 200-1 transmits an F1 removal request requesting removal of the F1 connection, to the child IAB node 300-2 via the F1 interface between the child IAB node 300-2 and the source gNB 200-1.

Here, the source gNB 200-1 transmits the F1 removal request to the child IAB node 300-2, located far from the source gNB 200-1 in an IAB topology instead of the parent IAB node 300-1, located close to the source gNB 200-1 in the IAB topology. This is because when the F1 connection of the parent IAB node 300-1 is removed first, the IAB-DU of the parent IAB node 300-1 may not function and continuous provision of service to the child IAB node 300-2 may not be possible.

In step S109, in response to receiving the F1 removal request, the child IAB node 300-2 transmits an F1 removal response to the source gNB 200-1 via the F1 interface between the child IAB node 300-2 and the source gNB 200-1.

In step S110, the source gNB 200-1 transmits, to the child IAB node 300-2, an RRC message (RRC de-activation) requesting RRC deactivation or suspension.

In step S111, the IAB-DU of the child IAB node 300-2 stops the service (Service stop).

In step S112, the source gNB 200-1 transmits an F1 removal request requesting the removal of the F1 connection, to the parent IAB node 300-1 via the F1 interface between the parent IAB node 300-1 and the source gNB 200-1.

In step S113, in response to receiving the F1 removal request, the parent IAB node 300-1 transmits the F1 removal response to the source gNB 200-1 via the F1 interface between the parent IAB node 300-1 and the source gNB 200-1.

In step S114, the IAB-DU of the parent IAB node 300-1 stops the service (Service stop).

As described above, in the handover operation according to an embodiment, the F1 connection is removed before the handover procedure in the RRC layer (RRC handover) is executed.

However, when the old F1 connection is automatically removed during the execution of a subsequent RRC handover, the processing of removing the F1 connection (i.e., steps S108 to S114) is unnecessary. Under such an assumption, at the time of RRC handover completion (RRC Reconfiguration Complete), the RRC layer of each IAB node 300 may notify the F1AP layer of the IAB node 300 of handover completion or an F1 connection removal request.

In step S115, the source gNB 200-1 transmits, to the parent IAB node 300-1, an RRC message (RRC Reconfiguration) corresponding to a handover command indicating handover to the target gNB 200-2. In response to receiving the RRC Reconfiguration message, the IAB-MT of the parent IAB node 300-1 performs backhaul RLC channel reestablishment (BH RLC CH Reestablishment) and routing update. The source gNB 200-1 may include an indicator to remove the F1 connection in the RRC message corresponding to the handover command. In response to receiving the indicator, the RRC entity (IAB-MT) may notify the F1 entity that the RRC entity has received the indicator for F1 connection removal.

In step S116, the IAB-MT of the parent IAB node 300-1 transmits, to the target gNB 200-2, an RRC message indicating completion of RRC reconfiguration (RRC Reconfiguration Complete). This causes the handover procedure in the RRC layer of the parent IAB node 300-1 to be completed. In addition, the RRC message may indicate completion of F1 connection removal. The F1 entity notifies the RRC entity that the F1 connection removal is complete, and the RRC entity may transmit the RRC message based on the notification.

When the RRC reconfiguration is complete (or the transmission of the RRC message is complete), the RRC entity may notify the F1 entity that the handover is complete. The notification triggers an F1 setup request (S118) described below. Specifically, in response to receiving the notification, the F1 entity transmits the F1 setup request.

In step S117, the target gNB 200-2 transmits, to the source gNB 200-1 via the Xn interface, a message (UE Context Release) causing the source gNB 200-1 to release context information for the parent IAB node 300-1. Note that the message need not be transmitted in this step but may be transmitted after the procedure is complete, that is, after step S129.

In step S118, the parent IAB node 300-1 transmits, to the target gNB 200-2, the F1 message (F1 Setup Request) requesting setup of the F1 connection between the target gNB 200-2 and the parent IAB node 300-1.

In step S119, the target gNB 200-2 transmits, to the parent IAB node 300-1, an F1 message (F1 Setup Response) indicating the setup of the F1 connection between the target gNB 200-2 and the parent IAB node 300-1. Steps S118 and S119 involves setting up of the F1 connection between the target gNB 200-2 and the parent IAB node 300-1 and setting up of the IAB-DU of the parent IAB node 300-1.

In step S120, the IAB-DU of the parent IAB node 300-1 resumes provision of the service.

The processing of steps S115 to S119 causes an F1 connection and an RRC connection to be established between the target gNB 200-2 and the parent IAB node 300-1 (step S121).

In step S122, the source gNB 200-1 transfers the context information for the child IAB node 300-2 to the target gNB 200-2 via the Xn interface (Child Context Transfer). The target gNB 200-2 modifies the context information for the child IAB node 300-2 as necessary.

In step S123, based on the context information for the child IAB node 300-2, the target gNB 200-2 transmits, to the child IAB node 300-2, an RRC reconfiguration message (RRC Re-activation) requesting activation or recovery of RRC.

In step S124, the IAB-MT of the child IAB node 300-2 transmits, to the target gNB 200-2, an RRC message (RRC Reconfiguration Complete) indicating completion of the RRC reconfiguration. The processing of steps S122 to S124 causes handover from the source gNB 200-1 to the target gNB 200-2 to be performed in the RRC layer of the child IAB node 300-2. In addition, the RRC message may indicate completion of F1 connection removal. The F1 entity notifies the RRC entity that the F1 connection removal is complete, and the RRC entity may transmit the RRC message based on the notification. When the RRC reconfiguration is complete (or the transmission of the RRC message is complete), the RRC entity may notify the F1 entity that the handover is complete. The notification triggers an F1 setup request (S126) described below. Specifically, in response to receiving the notification, the F1 entity transmits the F1 setup request.

In step S125, the target gNB 200-2 transmits, to the source gNB 200-1 via the Xn interface, the message (UE Context Release) causing the source gNB 200-1 to release the context information for the child IAB node 300-2.

In step S126, the child IAB node 300-2 transmits, to the target gNB 200-2, an F1 message (F1 Setup Request) requesting setup of the F1 connection between the target gNB 200-2 and the child IAB node 300-2.

In step S127, the target gNB 200-2 transmits, to the child IAB node 300-2, an F1 message (F1 Setup Response) indicating the setup of the F1 connection between the target gNB 200-2 and the child IAB node 300-2. Steps S126 and S127 involve setting up of the F1 connection between the target gNB 200-2 and the child IAB node 300-2 and setting up of the IAB-DU of the child IAB node 300-2.

In step S128, the IAB-DU of the child IAB node 300-2 resumes provision of the service.

The processing of steps S122 to S127 causes an F1 connection and an RRC connection to be established between the target gNB 200-2 and the child IAB node 300-2 (step S129).

Variations of Operations of Cellular Communication System

Although the operations according to the above-described embodiment (see FIG. 9) enable the IAB node 300 to be smoothly handed over, the service is stopped during the handover of the parent IAB node 300-1 and a relatively large amount of signaling is required. A method for performing more efficient handover (or RRC reestablishment) will be described below.

A communication control method according to a variation is a communication control method for handing over the relay node from the source gNB 200-1 to the target gNB 200-2 or reestablishing connection of the relay node with the target gNB 200-2 instead of the source gNB 200-1. The communication control method includes the step of transmitting, from the source gNB 200-1 to the target gNB 200-2, fronthaul configuration information related to the F1 connection (fronthaul connection) established between the IAB-DU of the IAB node 300 and the source gNB 200-1. Such fronthaul configuration information is hereinafter referred to as "F1 context information".

Transmitting F1 context information from the source gNB 200-1 to the target gNB 200-2 in this manner allows the F1 connection of the IAB-DU of the IAB node 300 to be smoothly relocated from the source gNB 200-1 to the target gNB 200-2.

(1) Variation 1

Figure 10:
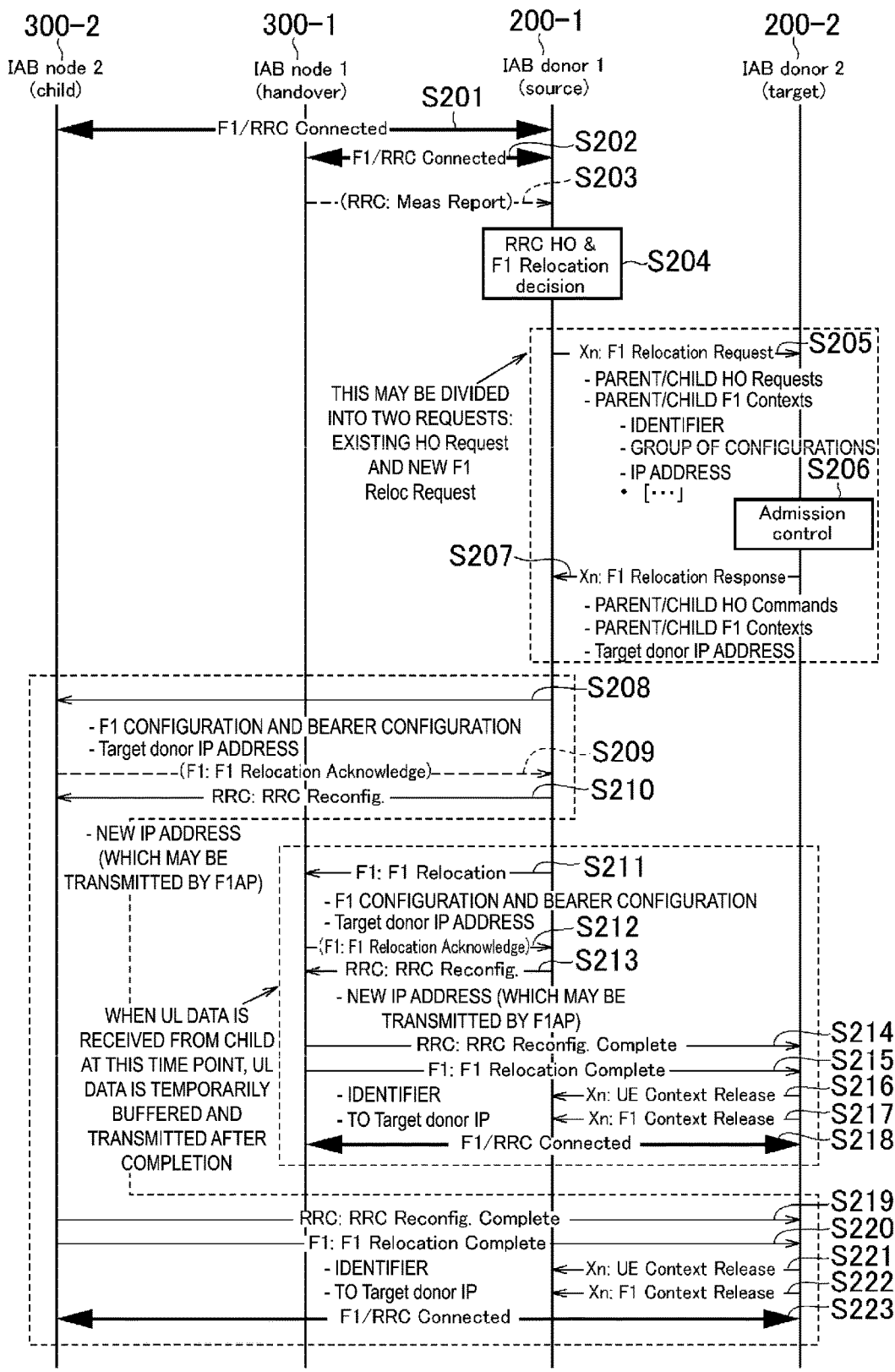
FIG. 10 is a diagram illustrating operations of Variation 1.

FIG. 10 is a diagram illustrating operations of Variation 1. In FIG. 10, dashed lines illustrate steps that are optional.

As illustrated in FIG. 10, in step S201, an F1 connection and an RRC connection are established between the child IAB node 300-2 and the source gNB 200-1. In step S202, an F1 connection and an RRC connection are established between the parent IAB node 300-1 and the source gNB 200-1.

In step S203, the IAB-MT of the parent IAB node 300-1 transmits, to the source gNB 200-1, a measurement report (Meas Report) including the results of radio state measurement. The RRC layer message includes the measurement report.

In step S204, the RRC layer of the source gNB 200-1 determines the handover of the parent IAB node 300-1 to the target gNB 200-2 and the F1 relocation of the parent IAB node 300-1 in the target gNB 200-2 based on the measurement report from the parent IAB node 300-1 (RRC HO & F1 Relocation decision).

In step S205, the source gNB 200-1 transmits a request message (F1 Relocation Request) to the target gNB 200-2 via the Xn interface. The request message is a message for requesting relocation of the F1 connection from the source gNB 200-1 to the target gNB 200-2, and includes F1 context information (fronthaul configuration information).

The request message (F1 Relocation Request) includes at least one selected from the group consisting of the following pieces of information from A to C.

A) F1 Context Information of Parent IAB Node 300-1

The F1 context information for the parent IAB node 300-1 includes at least one selected from the group consisting of the following pieces of information from A1 to A7.

A1) Transaction ID

A2) Name (human-readable name) of a gNB-CU

A3) Information list of cells of IAB-DU to be activated

Each entry in the list includes at least one selected from the group consisting of a cell ID (NR CGI and NR PCI), system information (SIB held by the CU), and a PLMN list.

A4) RRC version of gNB

A5) Identifier of parent IAB node 300-1 (DU and MT)

As the identifier of the parent IAB node 300-1, a transaction ID and/or a C-RNTI may be used. The identifier of the parent IAB node 300-1 is used to determine whether the IAB node 300 connected to the target gNB 200-2 is to be subjected to the present relocation processing.

A6) IP address of the parent IAB node 300-1 (DU)

On the assumption that the IP address of the parent IAB node 300-1 remains unchanged despite handover, notifying the target gNB 200-2 of the IP address in advance allows the target gNB 200-2 to utilize the IP address.

A7) F1 configuration information associated with the UE 100

The F1 configuration information includes at least one selected from the group consisting of an F1AP ID, an RRC related configuration, a DRX configuration, a bearer configuration (QoS, S-NSSAI, TNL configuration, etc.), and a serving PLMN•AMBR configuration.

B) F1 Context Information of the Child IAB Node 300-2

The F1 context information for the child IAB node 300-2 includes information same as, and/or similar to the pieces of information A1 to A7 described above. However, the parent IAB node 300-1 in A1 to A7 described above is replaced with the child IAB node 300-2. When the F1 context information for the child IAB node 300-2 is also transferred from the source gNB 200-1 to the target gNB 200-2, the F1 relocation of the parent IAB node 300-1 and the F1 relocation of the child IAB node 300-2 can be performed at once.

C) RRC Context Information for the Parent IAB Node 300-1 and RRC Context Information for the Child IAB Node 300-2

The F1 context information is context information related to the IAB-DU, while the RRC context information is context information related to the IAB-MT. The F1 context information is used for relocating the F1 connection, while the RRC context information is used for switching the RRC connection (i.e., handover). The RRC context information may be referred to as UE context information.

Note that the operation sequence represents an example in which a single request message (F1 Relocation Request) includes both F1 context information and RRC context information. However, the operation sequence may be an operation in which the handover request message including the RRC context information (HO Request) is transmitted and/or received separately from the request message including F1 context information (F1 Relocation Request).

In step S206, based on the request message from the source gNB 200-1, the target gNB 200-2 performs admission control of the handover of the parent IAB node 300-1 and the child IAB node 300-2. Here, description will be given on the assumption that the handover is determined to be executable. The target gNB 200-2 modifies, as necessary, the F1 context information and the RRC context information included in the request message.

In step S207, in response to receiving the request message, the target gNB 200-2 transmits, to the source gNB 200-1 via the Xn interface, the response message (F1 Relocation Response) responding to the request message. The response message includes at least one selected from the group consisting of F1 information (fronthaul correction information) indicating the content of a modification to the F1 configuration information, RRC information indicating the content of the modification to the RRC configuration information, and the IP address of the target gNB 200-2. The RRC information may be included in the Handover Command.

The response message (F1 Relocation Response) includes at least one selected from the group consisting of the F1 context information for the parent IAB node 300-1 and the F1 context information for the child IAB node 300-2. Only when the F1 context information from the source gNB 200-1 has been modified, the target gNB 200-2 may include, in the response message, a portion of the F1 context information corresponding to the modification. For example, the cell ID of the IAB-DU and the like desirably remain unchanged before and after the F1 relocation. However, the cell ID may be changed at the destination when the IAB node 300 is movable or the like.

The response message (F1 Relocation Response) includes at least one selected from the group consisting of the handover command (RRC information) for the parent IAB node 300-1 and the handover command (RRC information) for the child IAB node 300-2.

The response message (F1 Relocation Response) may include the IP address of the IAB-DU of the parent IAB node 300-1. The IP address may be an IP address determined or selected by the target gNB 200-2.

The response message (F1 Relocation Response) may include the IP address of the target gNB 200-2. The IP address may be included in the handover command.

In step S208, in response to receiving the response message (F1 Relocation Response), the source gNB 200-1 transmits the F1 relocation message (F1 Relocation) including the information for the child IAB node 300-2 included in the response message, to the child IAB node 300-2 via the F1 connection between the IAB-DU of the child IAB node 300-2 and the source gNB 200-1.

The F1 relocation message (F1 Relocation) includes at least one selected from the group consisting of the F1 context information, the IP address of the target gNB 200-2, and a new IP address of the child IAB node 300-2. However, at least one selected from the group consisting of the IP address of the target gNB 200-2 and the new IP address of the child IAB node 300-2 may be included in RRC Reconfiguration (handover command) in step S210 described below.

The source gNB 200-1 transmits the F1 relocation message (F1 Relocation) to the child IAB node 300-2 located far from source gNB 200-1 in the IAB topology instead of the parent IAB node 300-1 located close to the source gNB 200-1 in the IAB topology.

The source gNB 200-1 transmits the F1 relocation message (F1 Relocation) to the child IAB node 300-2 before transmitting RRC Reconfiguration (handover command) to the child IAB node 300-2 (step S210).

Note that, when the child IAB node 300-2 receives uplink data from the child node or the UE 100 while the F1 relocation is in execution (i.e., completion of the F1 relocation has not been notified to the target gNB 200-2), the child IAB node 300-2 may buffer the data and transfer the data to the target gNB 200-2 after the F1 relocation to the target gNB 200-2 is complete.

In step S209, the child IAB node 300-2 transmits a response message (F1 Relocation Acknowledge) indicating that the F1 relocation message has been received (or the F1 relocation processing has been initiated), to the source gNB 200-1 via the F1 connection between the IAB-DU of the child IAB node 300-2 and the source gNB 200-1.

In step S210, the source gNB 200-1 transmits, to the child IAB node 300-2, RRC Reconfiguration (handover command), used as an RRC message indicating handover to the target gNB 200-2.

In step S211, the source gNB 200-1 transmits the F1 relocation message (F1 Relocation) including the information for the parent IAB node 300-1 included in the response message (F1 Relocation Acknowledge), to the parent IAB node 300-1 via the F1 connection between the IAB-DU of the parent IAB node 300-1 and the source gNB 200-1.

The F1 relocation message (F1 Relocation) includes at least one selected from the group consisting of the F1 context information, the IP address of the target gNB 200-2, and the new IP address of the parent IAB node 300-1. However, at least one selected from the group consisting of the IP address of the target gNB 200-2 and the new IP address of the parent IAB node 300-1 may be included in RRC Reconfiguration (handover command) in step S213 described below.

Here, the source gNB 200-1 transmits the F1 relocation message (F1 Relocation) to the parent IAB node 300-1 before transmitting RRC Reconfiguration (handover command) to the parent IAB node 300-1 (step S213).

Note that, when the child IAB node 300-1 receives uplink data from the child node or the UE 100 while the F1 relocation is in execution (i.e., completion of the F1 relocation has not been notified to the target gNB 200-2), the parent IAB node 300-1 may buffer the data and transfer the data to the target gNB 200-2 after the F1 relocation to the target gNB 200-2 is complete.

In step S212, the parent IAB node 300-1 transmits the response message (F1 Relocation Acknowledge) indicating that the F1 relocation message has been received (or the F1 relocation processing is to be initiated), to the source gNB 200-1 via the F1 connection between the IAB-DU of the parent IAB node 300-1 and the source gNB 200-1. Note that step S212 is optional.

In step S213, the source gNB 200-1 transmits, to the parent IAB node 300-1, RRC Reconfiguration (handover command), used as an RRC message indicating handover to the target gNB 200-2.

In step S214, the IAB-MT of the parent IAB node 300-1 transmits, to the target gNB 200-2, the RRC message indicating completion of RRC reconfiguration (RRC Reconfiguration Complete). This causes the handover procedure in the RRC layer of the parent IAB node 300-1 to be completed. At this time, the RRC entity may notify the F1 entity that the RRC reconfiguration is complete. In other words, the notification may trigger the F1 relocation complete message (S215).

In step S215, the IAB-DU of the parent IAB node 300-1 transmits, to the target gNB 200-2, the F1 message indicating completion of the F1 relocation (F1 Relocation Complete). This causes the F1 relocation of the parent IAB node 300-1 to be completed. The F1 message (F1 Relocation Complete) is transmitted to the IP address of the target gNB 200-2. The F1 message (F1 Relocation Complete) may include the identifier of the parent IAB node 300-1 (DU and MT).

In step S216, the target gNB 200-2 transmits, to the source gNB 200-1 via the Xn interface, the message causing the source gNB 200-1 to release the RRC context information for the parent IAB node 300-1 (UE Context Release).

In step S217, the target gNB 200-2 transmits, to the source gNB 200-1 via the Xn interface, the message (F1 Context Release) causing the source gNB 200-1 to release the F1 context information for the parent IAB node 300-1.

In this manner, through the processing of steps S211 to S217, the relocation of the F1 connection of the parent IAB node 300-1 and the handover in the RRC layer of the parent IAB node 300-1 have been performed (step S218).

In step S219, the IAB-MT of the child IAB node 300-2 transmits, to the target gNB 200-2, the RRC message (RRC Reconfiguration Complete) indicating completion of RRC reconfiguration. This causes the handover procedure in the RRC layer of the child IAB node 300-2 to be completed. At this time, the RRC entity may notify the F1 entity that the RRC reconfiguration is complete. In other words, the notification may trigger the F1 relocation complete message (S220).

In step S220, the IAB-DU of the child IAB node 300-2 transmits, to the target gNB 200-2, the F1 message (F1 Relocation Complete) indicating completion of the F1 relocation. This causes the F1 relocation of the child IAB node 300-2 to be completed. The F1 message (F1 Relocation Complete) is transmitted to the IP address of the target gNB 200-2. The F1 message (F1 Relocation Complete) may include the identifier of the child IAB node 300-2 (DU and MT).

In step S221, the target gNB 200-2 transmits, to the source gNB 200-1 via the Xn interface, the message (UE Context Release) causing the source gNB 200-1 to release the RRC context information for the child IAB node 300-2.

In step S222, the target gNB 200-2 transmits, to the source gNB 200-1 via the Xn interface, the message (F1 Context Release) causing the source gNB 200-1 to release the F1 context information for the child IAB node 300-2.

In this manner, through the processing of steps S208 to S210 and steps S219 to S222, the relocation of the F1 connection of the child IAB node 300-2 and the handover in the RRC layer of the child IAB node 300-2 have been performed (step S223).

According to Variation 1, introducing the relocation processing for the F1 connection allows handover from the source gNB 200-1 to the target gNB 200-2 to be performed while the IAB node 300 continues the service.

(2) Variation 2

Figure 11:
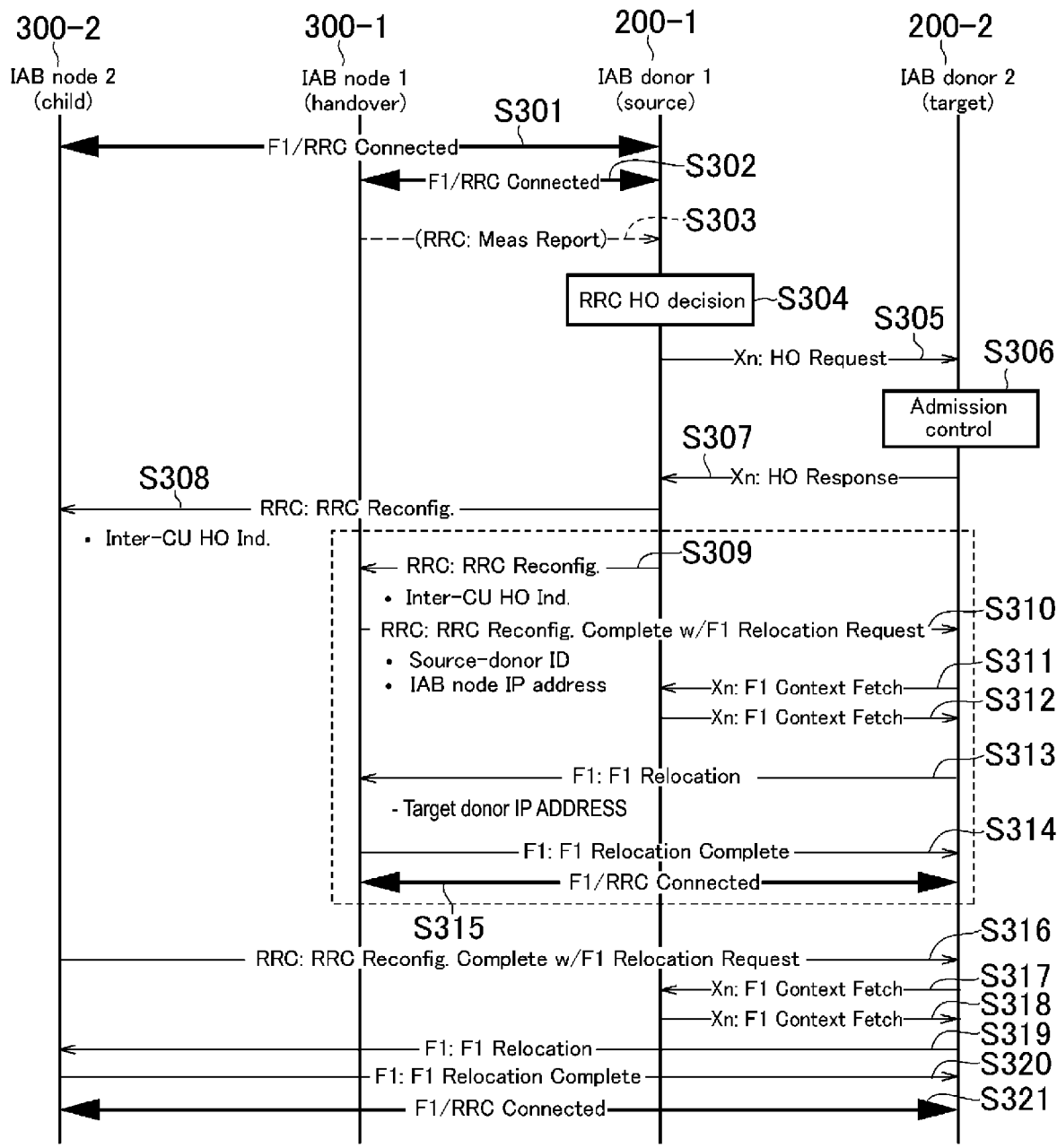
FIG. 11 is a diagram illustrating operations of Variation 2.

FIG. 11 is a diagram illustrating operations of Variation 2. In FIG. 11, dashed lines illustrate steps that are optional.

As illustrated in FIG. 11, the processing of steps S301 to S307 is the same as, and/or similar to the processing of steps S101 to S107 of the embodiment described above.

In step S308, the source gNB 200-1 transmits, to the child IAB node 300-2, RRC Reconfiguration (handover command), used as an RRC message indicating handover to the target gNB 200-2. The source gNB 200-1 may include, in RRC Reconfiguration (handover command), information (Inter-CU HO Indication) indicating that the handover is to occur between different gNBs 200 (different CUs).

In step S309, the source gNB 200-1 transmits, to the parent IAB node 300-1, RRC Reconfiguration (handover command), used as an RRC message indicating handover to the target gNB 200-2. The source gNB 200-1 may include, in RRC Reconfiguration (handover command), information (Inter-CU HO Indication) indicating that the handover is to occur between different gNBs 200 (different CUs).

In step S310, the IAB-MT of the parent IAB node 300-1 transmits, to the target gNB 200-2, the RRC message indicating completion of RRC reconfiguration (RRC Reconfiguration Complete). This causes the handover procedure in the RRC layer of the parent IAB node 300-1 to be completed.

Here, the IAB-MT of the parent IAB node 300-1 may include and transmit, in the RRC message (RRC Reconfiguration Complete), the relocation request (F1 Relocation Request) for requesting the relocation of the F1 connection from the source gNB 200-1 to the target gNB 200-2.

The IAB-MT of the parent IAB node 300-1 may include and transmit the identifier of the source gNB 200-1 (Source-donor ID) or the identifier of the source cell (Source Cell ID) in the RRC message (RRC Reconfiguration Complete).

The IAB-MT of the parent IAB node 300-1 may include and transmit the IP address of the parent IAB node 300-1 in the RRC message (RRC Reconfiguration Complete).

Note that the IAB-MT of the parent IAB node 300-1 may include and transmit, in a message different from RRC Reconfiguration Complete, at least one selected from the group consisting of the relocation request (F1 Relocation Request), the identifier of the source gNB 200-1 (Source-donor ID), the identifier of the source cell (Source Cell ID), and the IP address of the parent IAB node 300-1.

In step S311, the target gNB 200-2 transmits, to the source gNB 200-1 via the Xn interface, a request message (F1 Context Fetch) for acquiring the F1 context information (fronthaul configuration information) for the parent IAB node 300-1.

In step S312, in response to receiving the request message, the source gNB 200-1 transmits, to the target gNB 200-2, a notification message (F1 Context Fetch) including the F1 context information for the parent IAB node 300-1.

In step S313, based on the F1 context information for the parent IAB node 300-1, the target gNB 200-2 transmits, to the parent IAB node 300-1, the F1 relocation message (F1 Relocation) via the F1 connection. The F1 relocation message (F1 Relocation) may include at least one selected from the group consisting of the F1 context information, the IP address of the target gNB 200-2, and the new IP address of the parent IAB node 300-1.

In step S314, the IAB-DU of the parent IAB node 300-1 transmits, to the target gNB 200-2, the F1 message indicating completion of the F1 relocation (F1 Relocation Complete). This causes the F1 relocation of the parent IAB node 300-1 to be completed. The F1 message (F1 Relocation Complete) is transmitted to the IP address of the target gNB 200-2. The F1 message (F1 Relocation Complete) may include the identifier of the parent IAB node 300-1 (DU and MT).

In this manner, through the processing of steps S309 to S314, the relocation of the F1 connection of the parent IAB node 300-1 and the handover in the RRC layer of the parent IAB node 300-1 have been performed (step S315).

In step S316, the IAB-MT of the child IAB node 300-2 transmits, to the target gNB 200-2, the RRC message indicating completion of RRC reconfiguration (RRC Reconfiguration Complete). This causes the handover procedure in the RRC layer of the child IAB node 300-2 to be completed.

Here, the IAB-MT of the child IAB node 300-2 may include and transmit, in the RRC message (RRC Reconfiguration Complete), the relocation request (F1 Relocation Request) for requesting the relocation of the F1 connection from the source gNB 200-1 to the target gNB 200-2.

The IAB-MT of the child IAB node 300-2 may include and transmit the identifier of the source gNB 200-1 (Source-donor ID) or the identifier of the source cell (Source Cell ID) in the RRC message (RRC Reconfiguration Complete).

The IAB-MT of the child IAB node 300-2 may include and transmit the IP address of the child IAB node in the RRC message (RRC Reconfiguration Complete). Note that the IAB-MT of the child IAB node 300-2 may include and transmit, in a message different from RRC Reconfiguration Complete, at least one selected from the group consisting of the relocation request (F1 Relocation Request), the identifier of the source gNB 200-1 (Source-donor ID), the identifier of the source cell (Source Cell ID), and the IP address of the child IAB node 300-2.

In step S317, the target gNB 200-2 transmits, to the source gNB 200-1 via the Xn interface, the request message (F1 Context Fetch) for acquiring the F1 context information (fronthaul configuration information) for the child IAB node 300-2.

In step S318, in response to receiving the request message, the source gNB 200-1 transmits, to the target gNB 200-2, the notification message (F1 Context Fetch) including the F1 context information for the child IAB node 300-2.

In step S319, based on the F1 context information for the child IAB node 300-2, the target gNB 200-2 transmits the F1 relocation message (F1 Relocation) to the child IAB node 300-2 via the F1 connection. The F1 relocation message (F1 Relocation) may include at least one selected from the group consisting of the F1 context information, the IP address of the target gNB 200-2, and the new IP address of the child IAB node 300-2.

In step S320, the IAB-DU of the child IAB node 300-2 transmits, to the target gNB 200-2, the F1 message (F1 Relocation Complete) indicating completion of the F1 relocation. This causes the F1 relocation of the child IAB node 300-2 to be completed. The F1 message (F1 Relocation Complete) is transmitted to the IP address of the target gNB 200-2. The F1 message (F1 Relocation Complete) may include the identifier of the child IAB node 300-2 (DU and MT).

In this manner, through the processing of step S308 and steps S316 to S320, the relocation of the F1 connection of the child IAB node 300-2 and the handover of the child IAB node 300-2 in the RRC layer have been performed (step S321).

(3) Variation 3

Figure 12:
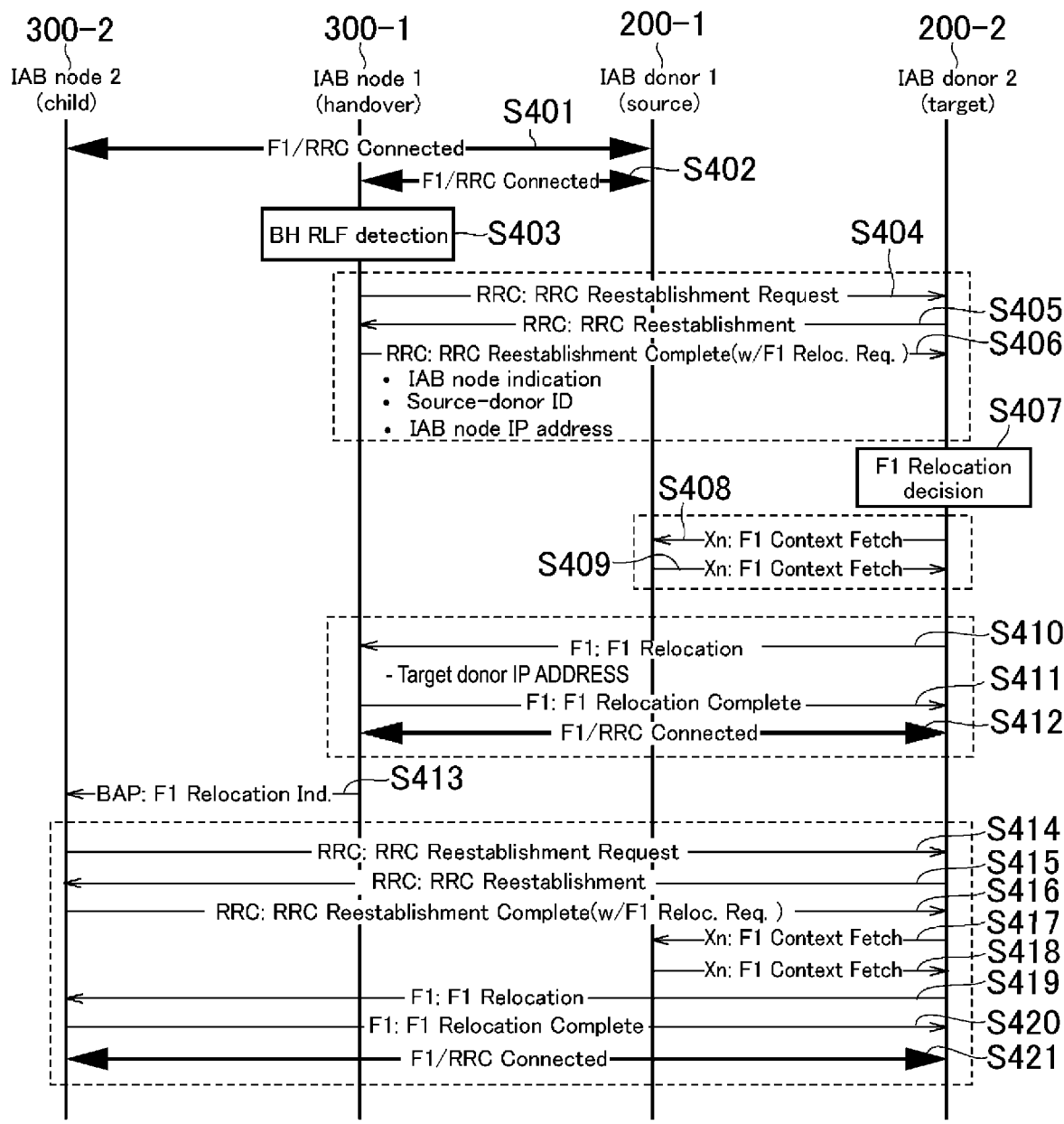
FIG. 12 is a diagram illustrating operations of Variation 3.

FIG. 12 is a diagram illustrating operations of Variation 3. Variation 3 is an operation assuming connection reestablishment (RRC reestablishment) instead of handover.

As illustrated in FIG. 12, in step S401, an F1 connection and an RRC connection are established between the child IAB node 300-2 and the source gNB 200-1. In step S402, an F1 connection and an RRC connection are established between the parent IAB node 300-1 and the source gNB 200-1.

In step S403, the IAB-MT of the parent IAB node 300-1 detects a failure in a wireless backhaul link (BH RLF) between the source gNB 200-1 and the parent IAB node 300-1.

In step S404, in response to detecting the BH RLF, the IAB-MT of the parent IAB node 300-1 transmits, to the target gNB 200-2, an RRC message (RRC Reestablishment Request) requesting RRC reestablishment.

In step S405, in response to receiving the RRC Reestablishment Request, the target gNB 200-2 transmits, to the parent IAB node 300-1, the RRC message (RRC Reestablishment) indicating RRC reestablishment.

In step S406, in response to receiving RRC Reestablishment, the IAB-MT of the parent IAB node 300-1 transmits, to the target gNB 200-2, an RRC message (RRC Reestablishment Complete) indicating completion of the RRC reestablishment.

Here, the IAB-MT of the parent IAB node 300-1 includes and transmits the F1 relocation request (F1 Relocation Request) in RRC Reestablishment Complete. The F1 relocation request may be information notifying that the parent IAB node 300-1 is to be connected as an IAB node.

The IAB-MT of the parent IAB node 300-1 may include and transmit the identifier of the source gNB 200-1 (Source-donor ID) or the identifier of the source cell (Source Cell ID) in the RRC message (RRC Reestablishment Complete).

The IAB-MT of the parent IAB node 300-1 may include and transmit the IP address of the parent IAB node 300-1 in the RRC message (RRC Reestablishment Complete).

In step S407, based on the information included in the RRC Reestablishment Complete, the target gNB 200-2 determines the relocation of the F1 connection of the parent IAB node 300-1 from the source gNB 200-1 to the target gNB 200-2 (F1 Relocation decision).

In step S408, the target gNB 200-2 transmits, to the source gNB 200-1 via the Xn interface, the request message (F1 Context Fetch) for acquiring the F1 context information (fronthaul configuration information) for the parent IAB node 300-1.

In step S409, in response to receiving the request message, the source gNB 200-1 transmits, to the target gNB 200-2, the notification message (F1 Context Fetch) including the F1 context information for the parent IAB node 300-1.

In step S410, based on the F1 context information for the parent IAB node 300-1, the target gNB 200-2 transmits, to the parent IAB node 300-1, the F1 relocation message (F1 Relocation) via the F1 connection. The F1 relocation message (F1 Relocation) may include at least one selected from the group consisting of the F1 context information, the IP address of the target gNB 200-2, and the new IP address of the parent IAB node 300-1.

In step S411, the IAB-DU of the parent IAB node 300-1 transmits, to the target gNB 200-2, the F1 message indicating completion of the F1 relocation (F1 Relocation Complete). This causes the F1 relocation of the parent IAB node 300-1 to be completed. The F1 message (F1 Relocation Complete) is transmitted to the IP address of the target gNB 200-2. The F1 message (F1 Relocation Complete) may include the identifier of the parent IAB node 300-1 (DU and MT).

In this manner, through the processing of step S404 to S411, the relocation of the F1 connection of the parent IAB node 300-1 and the reestablishment in the RRC layer of the parent IAB node 300-1 have been performed (step S412).

In step S413, the parent IAB node 300-1 notifies the child IAB node 300-2 that the F1 relocation is complete. The notification may be a notification indicating that the RRC reestablishment is complete. Here, the BAP layer of the parent IAB node 300-1 may notify, using the BAP control Protocol Data Unit (PDU), that the F1 relocation is complete or that the RRC reestablishment is complete. Such a notification may be a type of BH RLF Indication (another type), for example, a notification indicating "RLF Recovered with different donor".

In step S414, in response to the notification from the parent IAB node 300-1, the IAB-MT of the child IAB node 300-2 transmits, to the target gNB 200-2, the RRC message (RRC Reestablishment Request) requesting RRC reestablishment.

In step S415, in response to receiving the RRC Reestablishment Request, the target gNB 200-2 transmits, to the child IAB node 300-2, the RRC message (RRC Reestablishment) indicating RRC reestablishment.

In step S416, in response to receiving RRC Reestablishment, the IAB-MT of the child IAB node 300-2 transmits, to the target gNB 200-2, the RRC message (RRC Reestablishment Complete) indicating completion of the RRC reestablishment.

Here, the IAB-MT of the child IAB node 300-2 includes and transmits the F1 relocation request (F1 Relocation Request) in RRC Reestablishment Complete. The F1 relocation request may be information notifying that the child IAB node 300-2 is to be connected as an IAB node.

The IAB-MT of the child IAB node 300-2 may include and transmit the identifier of the source gNB 200-1 (Source-donor ID) or the identifier of the source cell (Source Cell ID) in the RRC message (RRC Reestablishment Complete).

The IAB-MT of the child IAB node 300-2 may include and transmit the IP address of the child IAB node 300-2 in the RRC message (RRC Reestablishment Complete).

In step S417, the target gNB 200-2 transmits, to the source gNB 200-1 via the Xn interface, the request message (F1 Context Fetch) for acquiring the F1 context information (fronthaul configuration information) for the child IAB node 300-2.

In step S418, in response to receiving the request message, the source gNB 200-1 transmits, to the target gNB 200-2, the notification message (F1 Context Fetch) including the F1 context information for the child IAB node 300-2.

In step S419, based on the F1 context information for the child IAB node 300-2, the target gNB 200-2 transmits the F1 relocation message (F1 Relocation) to the child IAB node 300-2 via the F1 connection. The F1 relocation message (F1 Relocation) may include at least one selected from the group consisting of the F1 context information, the IP address of the target gNB 200-2, and the new IP address of the child IAB node 300-2.

In step S420, the IAB-DU of the child IAB node 300-2 transmits, to the target gNB 200-2, the F1 message (F1 Relocation Complete) indicating completion of the F1 relocation. This causes the F1 relocation of the child IAB node 300-2 to be completed. The F1 message (F1 Relocation Complete) is transmitted to the IP address of the target gNB 200-2. The F1 message (F1 Relocation Complete) may include the identifier of the child IAB node 300-2 (DU and MT).

In this manner, through the processing of steps S414 to S420, the relocation of the F1 connection of the child IAB node 300-2 and the reestablishment in the RRC layer of the child IAB node 300-2 have been performed (step S421).

OTHER EMBODIMENTS

In the embodiments and variations described above, an example has been mainly described, in which the cellular communication system 1 is a 5G cellular communication system. However, the base station in the cellular communication system 1 may be an eNB that is an LTE base station. The core network in the cellular communication system 1 may be an Evolved Packet Core (EPC). The gNB can be connected to the EPC, the eNB can be connected to the 5GC, and the gNB and the eNB may be connected via an inter-base station interface (Xn interface, X2 interface).

A program may be provided that causes a computer to execute each of the processing operations according to the embodiments and the variations described above. The program may be recorded in a computer-readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like. A chip set may be provided that includes a memory that stores a program for executing each of the processing operations performed by the UE 100, the gNB 200, or the IAB node 300 and a processor that executes the program stored in the memory.

The invention claimed is:

1. A communication control method for handing over a relay node from a source network node to a target network node, the communication control method comprising:
   transmitting, by a source network node, to a target network node, a request message comprising information related to an F1 connection established between a distribution unit of a relay node and the source network node; and
   transmitting, by the target network node, to the source network node, a response message in response to the request message, wherein
   the response message comprises an IP address allocated to the relay node by the target network node.

2. A source network node in a communication system for handing over a relay node from the source network node to a target network node, the source network node comprising:
   a transmitter configured to transmit to a target network node, a request message comprising information related to an F1 connection established between a distribution unit of a relay node and the source network node, and
   a receiver configured to receive from the target network node, a response message in response to the request message, wherein the response message comprises an IP address allocated to the relay node by the target network node.

3. A target network node in a communication system for handing over a relay node from a source network node to the target network node, the target network node comprising:
   a receiver configured to receive from the source network node, a request message comprising information related to an F1 connection established between a distribution unit of a relay node and the source network node, and
   a transmitter configured to transmit to the source network node, a response message in response to the request message, wherein
   the response message comprises an IP address allocated to the relay node by the target network node.

* * * * *